(12) United States Patent
Yang et al.

(10) Patent No.: US 7,806,537 B2
(45) Date of Patent: *Oct. 5, 2010

(54) LIGHT GUIDE PLATE HAVING ORTHOGONAL STRESSES OR STRAINS AND BACKLIGHT MODULE THEREWITH

(75) Inventors: Xing-Peng Yang, Bei-Jing (CN); Ying-Bai Yan, Bei-Jing (CN); Guo-Fan Jin, Bei-Jing (CN)

(73) Assignees: Tsinghua University, Beijing (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 548 days.

This patent is subject to a terminal disclaimer.

(21) Appl. No.: 11/309,236

(22) Filed: Jul. 17, 2006

(65) Prior Publication Data

US 2007/0076432 A1 Apr. 5, 2007

(30) Foreign Application Priority Data

Jul. 20, 2005 (CN) .................. 2005 1 0036118

(51) Int. Cl.
 *F21V 9/14* (2006.01)
(52) U.S. Cl. .................. 362/19; 362/606; 362/626
(58) Field of Classification Search ............. 362/19, 362/615, 617, 623, 626, 629
 See application file for complete search history.

(56) References Cited

U.S. PATENT DOCUMENTS

| | | | | |
|---|---|---|---|---|
| 5,856,855 A | * | 1/1999 | Mol et al. .................. 349/65 |
| 5,982,540 A | * | 11/1999 | Koike et al. .................. 359/487 |
| 6,234,639 B1 | * | 5/2001 | Noguchi .................. 362/600 |
| 6,239,851 B1 | * | 5/2001 | Hatazawa et al. .............. 349/62 |
| 2002/0036729 A1 | * | 3/2002 | Ohkawa .................. 349/65 |
| 2006/0007700 A1 | * | 1/2006 | Hsu et al. .................. 362/600 |
| 2006/0285359 A1 | * | 12/2006 | Yang et al. .................. 362/615 |
| 2007/0076417 A1 | * | 4/2007 | Yang et al. .................. 362/458 |

FOREIGN PATENT DOCUMENTS

WO     WO 9708583 A1 * 3/1997

OTHER PUBLICATIONS

Xingpeng Yang, Yingbai Yan, and Guofan Jin; Polarized Light-Guide Plate for Liquid Crystal Display; pp. 8349-8356, vol. 13, No. 21, Optics Express 2005 (Clean Copy).*
Ko-Wei Chien and Han-Ping D. Shieh; Design and Fabrication of an Integrated Polarized Light Guide for Liquid-Crystal-Display Illumination; pp. 1830-1834, vol. 43, No. 9, Applied Optics 2004.
Xingpeng Yang, Yingbai Yan and Guofan Jin; Polarized Light-Guide Plate for Liquid Crystal Display; pp. 8349-8356, vol. 13, No. 21, Optics Express 2005.

* cited by examiner

*Primary Examiner*—Jong-Suk (James) Lee
*Assistant Examiner*—Kevin J. Spinella
(74) *Attorney, Agent, or Firm*—Jeffrey T. Knapp (57) ABSTRACT

A backlight module includes a light guide plate (52), a light source (51), a reflecting sheet (53), a diffusion sheet (54), and a reflective polarizing beam splitter (57). The light guide plate includes a light input surface (521), a light output surface (522) adjacent to the light input surface, a reflecting surface (523) opposite the light output surface, and a number of microstructures (524) located on the reflecting surface. In the light guide plate, stress-induced birefringence is introduced to achieve a polarization state conversion, thereby facilitating efficient use of the light generated by the light source.

9 Claims, 6 Drawing Sheets

LIGHT GUIDE PLATE HAVING
ORTHOGONAL STRESSES OR STRAINS AND
BACKLIGHT MODULE THEREWITH

CROSS-REFERENCE TO RELATED APPLICATIONS

This application is related to commonly-assigned, co-pending applications: entitled, "LIGHT GUIDE DEVICE AND BACKLIGHT MODULE THEREWITH", Ser. No. 11/309,238, filed Jul. 17, 2006; and "LIGHT GUIDE PLATE HAVING HIGH UTILIZATION OF LIGHT ENERGY AND BACKLIGHT MODULE ADOPTING THE SAME", Ser. No. 11/454,489, filed Jun. 16, 2006. The disclosure of the above identified applications are incorporated herein by reference.

FIELD OF THE INVENTION

The present invention relates to backlight modules used in liquid crystal displays (LCDs) and, more particularly, to a light guide plate with a function of converting polarization light and a backlight module adopting the light guide plate.

DESCRIPTION OF RELATED ART

LCDs are widely used in a range of electronic productions. In an LCD device, liquid crystal is a substance that does not itself radiate light. Instead, the liquid crystal relies on receiving light from a light source to thereby display images and data. In the case of a typical LCD device, a backlight module powered by electricity supplies the needed light.

Figure 5:
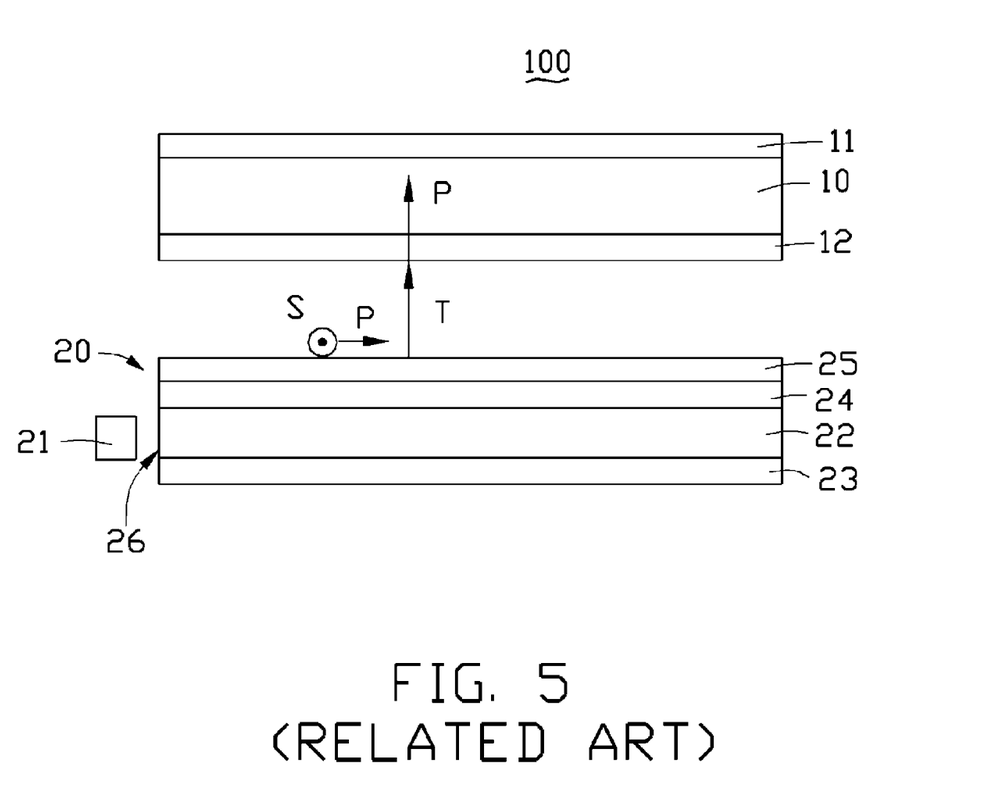
FIG. 5 is a schematic plan view of a conventional LCD device, including a backlight module and a LCD panel.

Referring to FIG. 5, a conventional LCD device 100 includes an LCD panel 10 and a backlight module 20 positioned under the LCD panel 10 for supplying light thereto. The backlight module 20 includes a light source 21, a light guide plate 22, a reflecting sheet 23, a diffusion sheet 24, and a prism sheet 25. Two polarized sheets 11 and 12 are located on the top and bottom surface of the LCD panel 10, respectively. The light source 21 is arranged facing the light input surface 26 of the light guide plate 22. These optical sheets are arranged in the proceeding bottom-up order: the reflecting sheet 23, the light guide plate 22, the diffusion sheet 24 and the prism sheet 25.

In the backlight module 20, a light emitted from the light source 21 transmits through the light guide plate 22, reflecting sheet 23, diffusion sheet 24 and the prism sheet 25, in sequence, and then is converted into a planar light T. The planar light T includes a P polarized light and an S polarized light. The P polarized light is parallel to a light axis of the polarized sheet 12, and the S polarized light is perpendicular thereto. While the planar light transmits through the polarized sheet 12, only the P polarized light can transmit thereoutof and the S polarized light is reflected and/or absorbed thereby. As such, only 50% light is used, thereby reducing the utilization efficiency of light energy.

Figure 6:
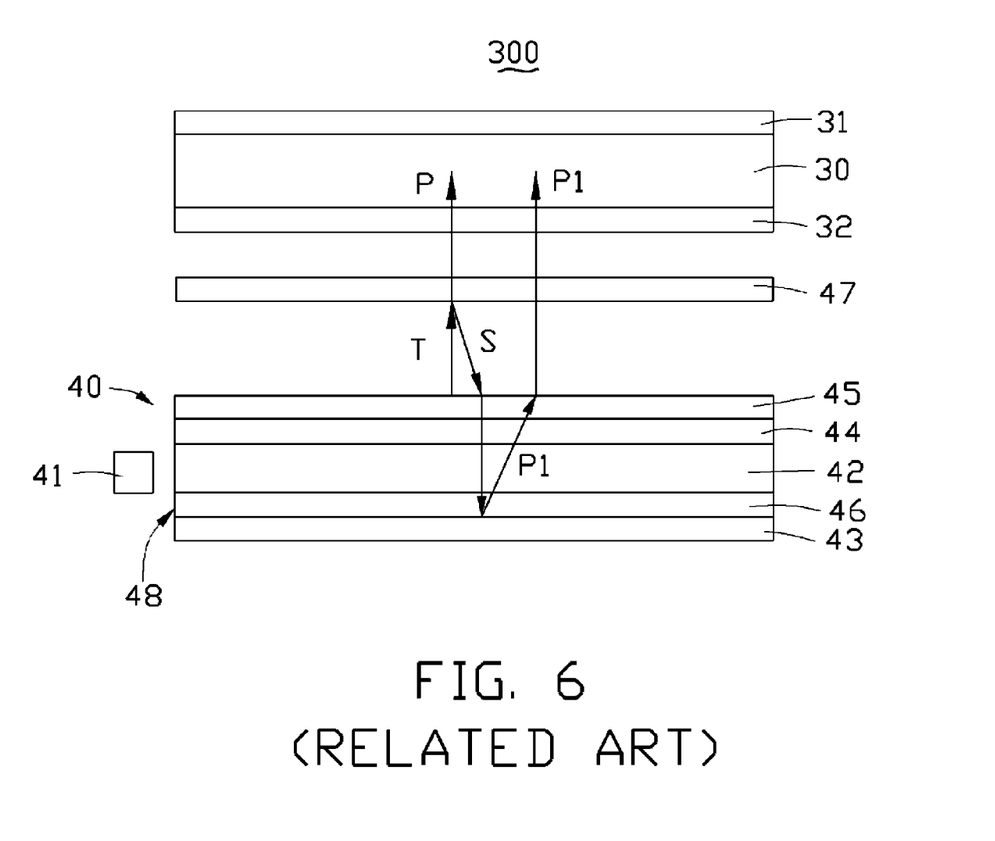
FIG. 6 is a schematic plan view of another conventional LCD device, including a backlight module and a LCD panel.

Referring to FIG. 6, another conventional LCD device 300 includes an LCD panel 30 and a backlight module 40 positioned under the LCD panel 10 for supplying light thereto. The backlight module 40 includes a light source 41, a light guide plate 42, a reflecting sheet 43, a diffusion sheet 44, a prism sheet 45, a quarter wavelength plate 46, and a reflective polarizing beam splitter (PBS) 47. Two polarized sheets 31 and 32 are located on the top and bottom surface of the LCD panel 30, respectively. The light source 41 is arranged facing the light input surface 48 of the light guide plate 42. These optical sheets are arranged in the following sequence: the reflecting sheet 43, the quarter wavelength plate 46, the light guide plate 42, the diffusion sheet 44, the prism sheet 45 and the reflective PBS 47.

In operation, the light source 41 emits a light. A portion of the light transmits through the light guide plate 42, the diffusion sheet 44 and the prism sheet 45 and then is converted into a planar light T. The planar light T includes a P polarized light and an S polarized light. The P polarized light transmits through the reflective PBS 47 and the polarized sheet 32 and optically couples into the LCD panel 30. The reflective PBS 47 reflects the S polarized light back into the backlight module 40. The S polarized light is converted into a P polarized light P1 by passing twice through the quarter wavelength plate 46. The P polarized light P1 transmits through the reflective PBS 47 and the polarized sheet 32 and optically couples into the LCD panel 30. Finally, both P and S polarized light are utilized to illuminate the LCD panel 30. This configuration improves the utilization efficiency of light energy.

When the backlight module 40 is used in a color LCD device, the reflective PBS 47 and the polarized sheet 32 must work for multiple wavelengths light. An achromatic quarter wavelength plate works instead of the quarter wavelength plate 46 to achieve the equal phase retardation for each wavelength light.

In this configuration, the light is reflected by the quarter wavelength plate and then is frequently refracted and diffused by the surfaces of the light guide plate. Thus, a portion of light is consumed and thereby the utilization efficiency of light energy is reduced.

SUMMARY OF THE INVENTION

A backlight module includes a light source for emitting light, a light guide plate adjacent to the light source, a reflecting sheet on the bottom of the light guide plate, and a reflective PBS on the top of the light guide plate. The light guide plate has a light input surface, a light output surface adjacent to the light input surface, and a reflective surface opposite to the light output surface. Two orthogonal stresses or strains are formed in the light guide plate. An angle between one stress or strain and a light input surface of light guide plate is chosen to be in the range from above about 0 degree to about 90 degrees, and the phase retardation, due to the stress or strain difference, of light passing through the light guide plate twice is defined by the equations:

$$\delta = 2\pi C \Delta \sigma L / \lambda = 2k\pi + \pi_{k=0,1,2,3,4,\ldots}$$

In the above equations, $\delta$ represents the phase retardation value of light passing through the light guide plate twice, L represents twice the thickness of the light guide plate, C represents the stress-optical or strain-optical coefficient, $\Delta\sigma$ represents the stress difference or strain difference, and $\lambda$ represents wavelength of an incident light.

Other advantages and novel features of the present light guide plate and the backlight module therewith will become more apparent from the following detailed description of preferred embodiments when taken in conjunction with the accompanying drawings.

BRIEF DESCRIPTION OF THE DRAWINGS

Many aspects of the present light guide plate and the backlight module therewith can be better understood with reference to the following drawings. The components in the drawing are not necessarily drawn to scale, the emphasis instead be placed upon clearly illustrating the principles of the present backlight module. Moreover, in the drawings, like reference numeral designate corresponding parts throughout the several views.

The exemplifications set out herein illustrate at least one preferred embodiment of the present light guide plate and the backlight module therewith, and such exemplifications are not to be construed as limiting the scope of the invention in any manner.

DETAILED DESCRIPTION OF THE INVENTION

Reference will now be made to the drawings to describe preferred embodiments of the present light guide plate and the present backlight module therewith, in detail.

Figure 1:
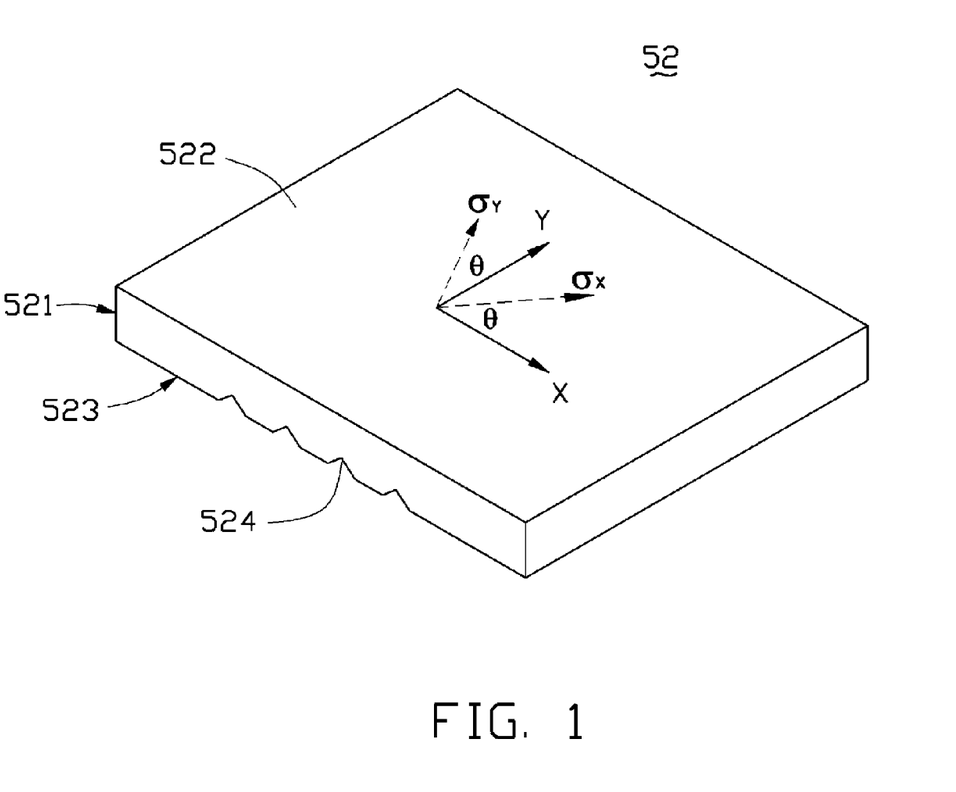
FIG. 1 is an isometric view of a light guide plate, according to a first embodiment.

FIG. 1 shows an isometric view of a light guide plate according to a first embodiment. The shape of the light guide plate 52 is flat. The light guide plate 52 includes a light input surface 521, a light output surface 522 adjacent to the light input surface 521, a reflecting surface 523 opposite to the light output surface 522, and a number of microstructures 524 located on the reflecting surface 523. The present light guide plate 52 is advantageously made of bisphenol-A polycarbonate (BAPC). The light output surface 522 is planar, and the microstructure 524 is in a shape of a V-shaped groove. Beneficially, respective heights of the microstructures 524 progressively increase, and/or respective distances between adjacent microstructures 524 progressively decrease with increasing distance from the light input surface 521, with both progressions occurring being more optimal, as each tends to improve a brightness uniformity of the light guide plate 52.

In the light guide plate 52, a stress-induced birefringence is introduced to realize S-P polarized light conversion based on the principle of a photoelastic effect, and a stress is optimized. The stress-optical law of the plane photoelasticity can be expressed as $$\Delta n = n_{\sigma Y} - n_{\sigma X} = C\Delta\sigma \quad (1)$$

In the light guide plate 52, a stress-induced birefringence is introduced to realize s-p polarized light conversion based on the principle of a photoelastic effect, and a stress is optimized. The stress-optical law of the plane photoelasticity can be expressed as $$\Delta n = n_{\sigma y} - n_{\sigma x} = C\Delta\sigma$$

The amount of produced birefringence ($\Delta n$) is proportional to the stress difference ($\Delta\sigma = \sigma_Y - \sigma_X$), provided the stress is not too large. C indicates the stress-optical coefficient.

Figure 2:
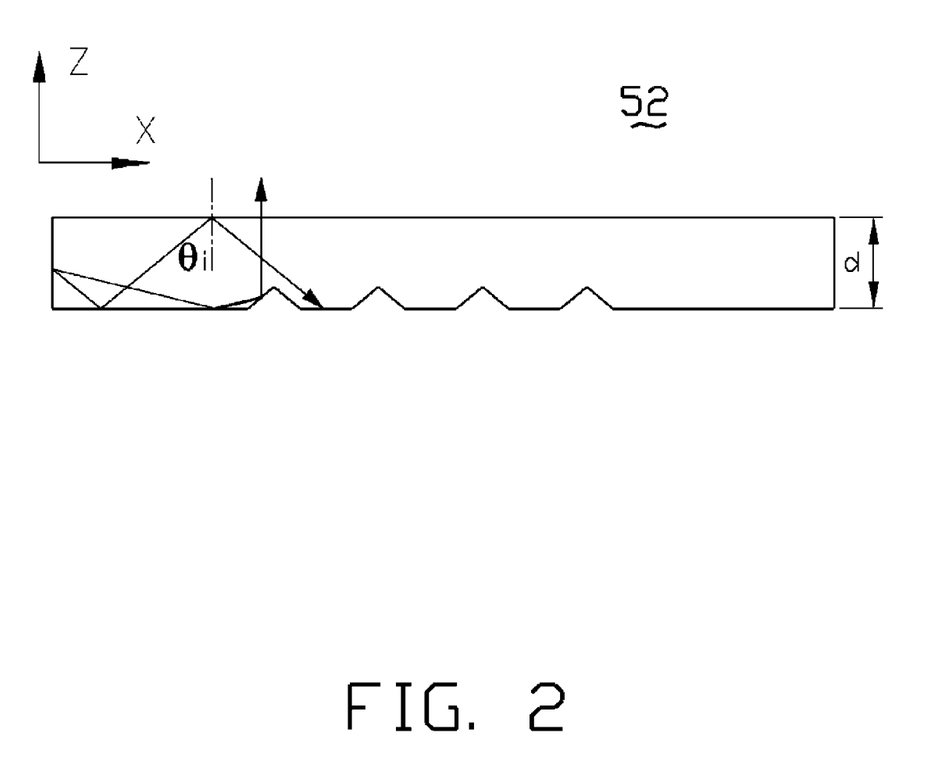
FIG. 2 is a light path view of the light guide plate of FIG. 1.

As shown in FIGS. 1 and 2, an X axis is defined perpendicular to the light input surface 521, and a Y axis is defined parallel to the light output surface 522 and perpendicular to the X axis. The stress is applied along a $\sigma_X$ axis and a $\sigma_Y$ axis, respectively. The $\sigma_X$ axis is perpendicular to the $\sigma_Y$ axis and an angle between the $\sigma_X$ axis and the X axis is denoted as $\theta$. The angle $\theta$ is in the range of above about 0 degree to less than about 90 degrees (i.e., a discernable angle that is less than absolute orthogonal), and the preferred angle $\theta$ of the present light guide plate 52 is 45 degrees. The thickness of the light guide plate is denoted as d. A phase retardation value $\delta$ of passing through the light guide plate 52 twice can be written as $$\delta = 2\pi C \Delta \sigma L / \lambda \quad (2)$$

where $\lambda$ denotes the wavelength of the incident light, and L=2d (i.e., double the thickness).

In X-Y coordinates, the Jones matrix T can be expressed as $$T = R(\beta) T_\sigma R(-\beta) = \begin{bmatrix} \cos\theta & -\sin\theta \\ \sin\theta & \cos\theta \end{bmatrix} \begin{bmatrix} 1 & 0 \\ 0 & e^{j\delta} \end{bmatrix} \begin{bmatrix} \cos\theta & \sin\theta \\ -\sin\theta & \cos\theta \end{bmatrix}$$

The incident Y directional polarized light can be written as $$E_i = A \begin{bmatrix} 0 \\ 1 \end{bmatrix},$$

wherein A denotes the light wave amplitude. The light passing through the light guide plate 52 twice can be written as $$E_0 = \begin{bmatrix} E_{ox} \\ E_{oy} \end{bmatrix} = TE_i = A \begin{bmatrix} \sin\theta\cos\theta - \sin\theta\cos\theta e^{j\delta} \\ \sin^2\theta + \cos^2\theta e^{j\delta} \end{bmatrix}$$

The intensity of the X directional polarized light transmitted from a polarizing beam splitter is $$I = A^2 \sin^2 2\theta \sin^2(\delta/2) = A^2 \sin^2 2\theta \sin^2(\pi L C \Delta\sigma/\lambda). \quad (5)$$

Under the conditions of $$\begin{cases} \theta = \pi/4 \\ \delta = 2k\pi + \pi_{k=0,1,2,3,4,\ldots} \end{cases}$$

Light can emit through the light output surface 522 when light incidence angle $\theta_i$ is small enough. The microstructure 524 is structured and arranged for achieving a desired light incidence angle $\theta_i$. In the present embodiment, the light incidence angle $\theta_i$ is 0 degrees.

The intensity achieves the maximum value $A^2$, and the efficiency of polarization conversion is almost 100%. Eq. (6) means that the light guide plate 52 with an applied stress is similar to the quarter wavelength retardation plate. As the achromatic backlight system, the phase retardation value should be close to $2k\pi+\pi$ for the multiple wavelengths of $\lambda_R$ (656.3 nm), $\lambda_G$ (589.3 nm), and $\lambda_B$ (486.1 nm). Hence, the stress difference $\Delta\sigma$ should be optimized. The optimization problem can be expressed by the minimum of objective function as $$y = \min_{\Delta\sigma}\{w_R \times \text{abs}[\text{mod}(\delta_R, 2\pi) - \pi] +$$
$$w_G \times \text{abs}[\text{mod}(\delta_G, 2\pi) - \pi] + w_B \times \text{abs}[\text{mod}(\delta_B, 2\pi) - \pi]\}$$

where mod denotes modules after division, abs returns absolute value, and $\delta_R$, $\delta_G$ and $\delta_B$ denote the phase retardation values for wavelengths of $\lambda_R$, $\lambda_G$, and $\lambda_B$ respectively. $W_R$, $w_G$, and $W_B$ denote statistical weighting factors of the light of wavelengths Of $\lambda_R$ (656.3 nm), $\lambda_G$ (589.3 nm) and $\lambda_B$ (486.1 nm), respectively. In the present light guide plate 52, all the weight factors are set to 1.0.

Figure 3:
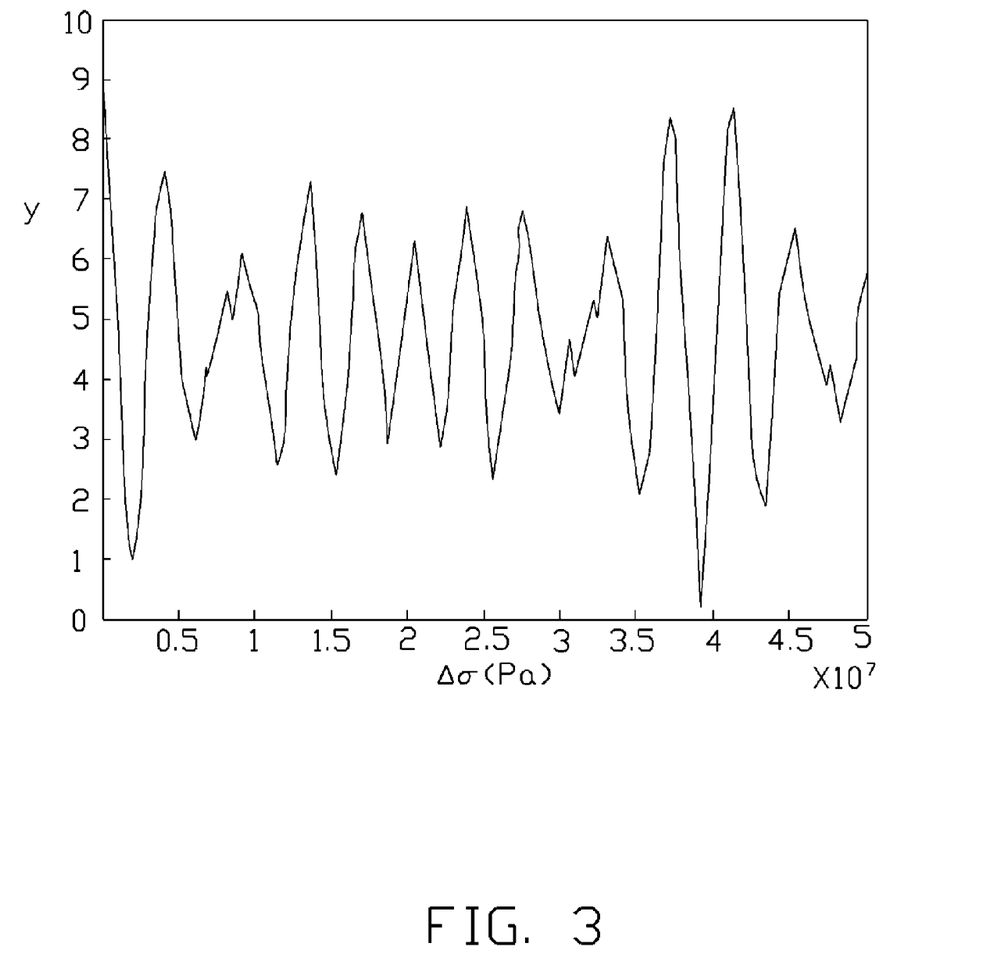
FIG. 3 is an objective function value—stress difference graph of the light guide plate, according to the first embodiment.

The preferred thickness of the present light guide plate is 0.8 mm. The light guide plate 52 is made of BAPC, so the stress-optical coefficient C is $8.9\times10^{-12}$ Pa$^{-1}$. The objective function values with respect to the stress difference are plotted in FIG. 3. When $\Delta\sigma=3.927\times10^7$ Pa, the local minimum value of Eq. (7) is obtained. The phase retardations of the light of the wavelength of $\lambda_R$ (656.3 nm), $\lambda_G$ (589.3 nm) and $\lambda_B$ (486.1 nm) are:

$$\begin{cases} \delta_R = 16\pi + 1.04\pi \\ \delta_G = 18\pi + 0.98\pi \\ \delta_B = 22\pi + 1.0\pi \end{cases}$$

Compared with the ideal achromatic wave plate, the maximum error is only 4%. As $\theta=\pi/4$, Eq. (5) indicates that the polarization conversion efficiency of the present light guide plate is more than 99%. The 4% error of phase retardation only leads to a 1% decrease in conversion efficiency. The light guide plate with applied stress can realize the polarization conversion, and the quarter wavelength plate can be left out. The stress-induced birefringence can remain in the light guide plate by using stress-freezing techniques. In a like manner, the strain-induced birefringence can be applied to achieve the polarization conversion, too.

Figure 4:
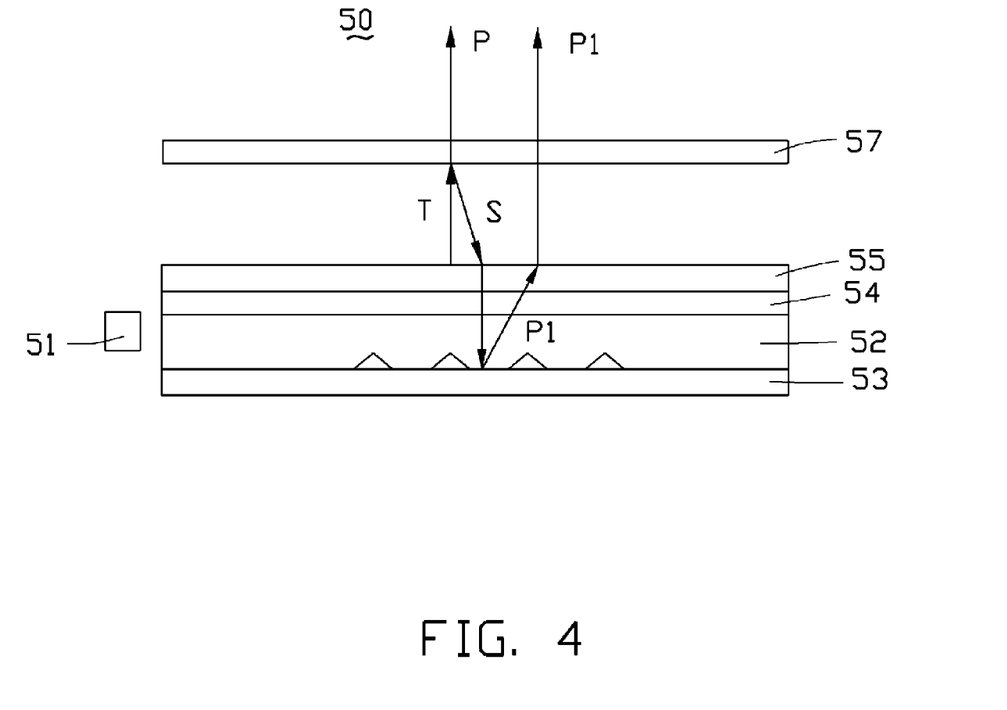
FIG. 4 is schematic plan view of a backlight module, according to a second embodiment.

FIG. 4 is schematic plan view of a backlight module according to a second embodiment. The present backlight module 50 includes the light guide plate 52 and further includes a light source 51, a reflecting sheet 53, a diffusion sheet 54, a prism sheet 55 and a reflective polarizing beam splitter 57. In the present backlight module 50, the light source 51 is a light emitting diode (LED) facing the light input surface 521, and the optical sheets are arranged in the following bottom-up order: the reflecting sheet 53, the light guide plate 52, the diffusion sheet 54, the prism sheet 55 and the reflective polarizing beam splitter 57.

When the present backlight module 50 is in use, the light source 51 emits multiple wavelengths of light. A portion of the light transmits through the light guide plate 52, the diffusion sheet 54, and the prism sheet 55, in sequence, and then is converted into a plane light T. The plane light T includes a P polarized light and an S polarized light. The P polarized light transmits through the reflective polarizing beam splitter 57 and then illuminates an LCD panel (not shown). The reflective PBS 57 reflects the S polarized light back into the backlight module 50. Therefore, the S polarized light transmits through the light guide plate 52 twice and then is converted into another P polarized light. Furthermore, essentially all of the light emitted from the light source can be utilized. The assembly of the backlight module 50 and reflective PBS 57 can convert and utilize the multiple wavelengths light to illuminate the LCD panel, so the utilization efficiency of light energy is improved.

It is clear that a birefringence light guide plate can also be achieved by optimizing the strain, using the principle of the photoelastic effect, similar with the present optimizing process.

The present light guide plate may have other embodiments, such as the following example.

The shape of the light guide plate is that of a wedge, instead. The microstructure 524 on the bottom of the light guide plate can be one of a cylindrical shape, a hemispherical shape, a pyramidal shape, a cubic shape, a cuboid shape, and so on. The microstructures 524, alternatively, are distributed uniformly, and/or the heights thereof and/or distances therebetween may increase with increasing distance from the light input surface to promote uniform brightness. The light guide plate may be made of a material selected from a group consisting of optical glasses and plastics, such as polymethyl methacrylate (PMMA), polystyrene (PS), polysulfone and polyetherimide. The wavelength of light is not limited to the particular wavelengths mentioned above.

The present backlight module may have also other embodiments, such as the following example.

The light source may be a cold cathode fluorescent lamp (CCFL). The reflective PBS may be arranged between the light output surface and the diffusion sheet or between the diffusion sheet and prism sheet. The shape of microstructures 524 may be cylindrical, hemispherical, cubic, cuboid, pyramidal, and so on.

Finally, it is to be understood that the embodiments mentioned above are intended to illustrate rather than limit the invention. Variations may be made to the embodiments without departing from the spirit of the invention as claimed. The above-described embodiments illustrate the scope of the invention but do not restrict the scope of the invention.

What is claimed is:

1. A light guide plate, comprising:
   a light input surface, a light output surface adjacent to the light input surface, and a reflective surface opposite to the light output surface;
   two orthogonal stresses or strains existing in the light guide plate, an angle in the range more than about 0 and less than about 90 degrees between one of the two orthogonal stresses or strains and the light input surface of the light guide plate, a stress or strain difference existing between the two orthogonal stresses or strains;
   a phase retardation due to the stress or strain difference, the phase retardation being defined by the equations:

$$\delta = 2\pi C \Delta\sigma L/\lambda = 2k\pi + \pi_{k=0,1,2,3,4,...}$$

$\delta$ represents the phase retardation value of light passing through the light guide plate twice, L represents twice the thickness of the light guide plate, C represents the stress-optical or strain-optical coefficient, $\Delta\sigma$ represents the stress difference or strain difference, and $\lambda$ represents wavelength of an incident light.

2. The light guide plate as defined in claim 1, wherein the angle between one stress or strain and the light input surface is about 45 degrees.

3. The light guide plate as defined in claim 1, wherein the stress or strain is defined by the minimum of an objective function:

$$y = \min_{\Delta\sigma}\{w_R \times \text{abs}[\text{mod}(\delta_R, 2\pi) - \pi] + w_G \times \text{abs}[\text{mod}(\delta_G, 2\pi) - \pi] + w_B \times \text{abs}[\text{mod}(\delta_B, 2\pi) - \pi]\}$$

wherein mod denotes modules after division, abs indicates an absolute value, $\delta R$, $\delta G$, and $\delta B$ denote the phase retardation values for wavelengths of $\lambda R$, $\lambda G$, and $\lambda B$, respectively, and $w_R$, $w_G$, and $w_B$ denote statistical weight factors for wavelengths of $\lambda R$, $\lambda G$, and $\lambda B$, respectively.

4. The light guide plate as defined in claim 1, wherein a plurality of microstructures is formed on the reflective surface of the light guide plate.

5. The light guide plate as defined in claim 4, wherein at least one of the plurality of microstructures is in the shape of a V-shaped groove.

6. A light guide plate, comprising:
a light input surface configured for inputting light beams emitting from a light source;
a light output surface adjacent to the light input surface, and configured for outputting a plane light;
a reflective surface opposite to the light output surface, and configured for reflecting the light beams toward the light output surface; and
two orthogonal strains existing in the light guide plate, wherein,
one of the two orthogonal strains and the light input surface of the light guide plate form an angle in a range of more than about 0 and less than about 90 degrees therebetween;
a strain difference exists between the two orthogonal strains; and
a phase retardation is achieved due to the strain difference, for making a S-polarized light passing through the light guide plate twice to be converted into a P-polarized light, the S-polarized light is input from the light output surface and reflected by the reflective surface.

7. The light guide plate as defined in claim 6, wherein the angle between one stress or strain and the light input surface is about 45 degrees.

8. The light guide plate as defined in claim 6, wherein a plurality of microstructures is formed on the reflective surface of the light guide plate.

9. The light guide plate as defined in claim 6, wherein polarization of the S-polarized light is perpendicular to polarization of the P-polarized light.

* * * * *